a method includes determining a network counter value indicative of a network clock time of a system at a first time instant and a second time instant occurring later in time than the first time instant. The method further includes determining an audio counter value indicative of an audio clock time of the system at a third time instant occurring the first and second time instants and a fourth time instant occurring later in time than the second time instant. The method further includes determining an offset based upon the determined network counter values and the audio counter values. The method further includes adjusting the audio clock time based upon the determined offset to synchronize operation of at least one audio component operating according to the audio clock with at least one audio component operating according to the network clock. An associated system is also disclosed.

(12) United States Patent
Stanton et al.

(10) Patent No.: US 7,680,154 B2
(45) Date of Patent: Mar. 16, 2010

(54) METHODS AND APPARATUS FOR SYNCHRONIZING NETWORKED AUDIO DEVICES

(75) Inventors: Kevin Stanton, Hillsboro, OR (US); Frank Hady, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 11/967,301

(22) Filed: Dec. 31, 2007

(65) Prior Publication Data

US 2009/0168935 A1 Jul. 2, 2009

(51) Int. Cl.
*H04J 3/06* (2006.01)
(52) U.S. Cl. .................... 370/507; 370/503
(58) Field of Classification Search ......... 370/503–521
See application file for complete search history.

(56) References Cited

U.S. PATENT DOCUMENTS

| | | | | |
|---|---|---|---|---|
| 5,602,992 | A * | 2/1997 | Danneels | 709/248 |
| 6,816,510 | B1 * | 11/2004 | Banerjee | 370/503 |
| 7,391,791 | B2 * | 6/2008 | Balassanian et al. | 370/503 |
| 7,573,914 | B2 * | 8/2009 | Ilnicki et al. | 370/519 |
| 2003/0043856 | A1 * | 3/2003 | Lakaniemi et al. | 370/503 |
| 2003/0048811 | A1 * | 3/2003 | Robie et al. | 370/509 |
| 2006/0233203 | A1 * | 10/2006 | Iwamura | 370/516 |
| 2007/0025481 | A1 * | 2/2007 | Ryu et al. | 375/354 |
| 2008/0187282 | A1 * | 8/2008 | Brady et al. | 386/66 |
| 2008/0235009 | A1 * | 9/2008 | Heikkinen et al. | 704/220 |
| 2009/0086764 | A1 * | 4/2009 | Lee et al. | 370/503 |
| 2009/0088880 | A1 * | 4/2009 | Thapa | 700/94 |
| 2009/0135854 | A1 * | 5/2009 | Bettin et al. | 370/503 |
| 2009/0168935 | A1 * | 7/2009 | Stanton et al. | 375/356 |
| 2009/0225790 | A1 * | 9/2009 | Shay et al. | 370/503 |

OTHER PUBLICATIONS

Hollander, K.D., Garner, G.M., Feng, F., Jeong, P., Ryu, E.H.S., "Localization Approaches Based on Ethernet Technology," 8 pages.
Garner, G.M., "Description of Use of IEEE 1588 Followup Peer-to-Peer Transparent Clock in A/V Bridging Networks," Mar. 27, 2006, 23 pages.
Jeffree, T., "Approaches to Policing and Shaping in P802.1av," Feb. 28, 2007, 2 pages.

(Continued)

*Primary Examiner*—Chi H Pham
*Assistant Examiner*—Robert Lopata
(74) *Attorney, Agent, or Firm*—Grossman, Tucker, Perreault & Pfleger, PLLC

(57) ABSTRACT

A method includes determining a network counter value indicative of a network clock time of a system at a first time instant and a second time instant occurring later in time than the first time instant. The method further includes determining an audio counter value indicative of an audio clock time of the system at a third time instant occurring the first and second time instants and a fourth time instant occurring later in time than the second time instant. The method further includes determining an offset based upon the determined network counter values and the audio counter values. The method further includes adjusting the audio clock time based upon the determined offset to synchronize operation of at least one audio component operating according to the audio clock with at least one audio component operating according to the network clock. An associated system is also disclosed.

15 Claims, 4 Drawing Sheets

OTHER PUBLICATIONS

Jeffree, T., "SRP—An Alternative Approach," Feb. 16, 2007, 8 pages.

"Timing and Synchronization for Time-Sensitive Applications in Bridged Local Area Networks," IEEE 802, Nov. 2, 2005, 6 pages.

Feng F., "Interfacing Between SRP and RSVP or Other Applications," IEEE 802.1 AVB, Jul. 2006, 9 pages.

Garner, G.M., "Multicast (Group) Addresses for Layer 2 (Ethernet) Transport of IEEE 1588 PTP Messages, with Application to AVB," IEEE 802.1 AVB TG, IEEE 1588, May 16, 2006, 19 pages.

"P802.1BA Audio Video Bridging (AVB) Systems," IEEE 802, AVB Task Group, Nov. 15, 2007, 5 pages.

Fuller, J.N., "Stream Setup and Teardown," Mar. 14, 2007, 26 pages.

Olsen, D., "Stream Address Allocation in Ethernet AVB," IEEE 802, AVB Task Group, March meeting, Mar. 14, 2007, 27 pages.

Joo, S.S., "Isochronous Resource Reservation with the Probability Based Admission", IEEE 802.1 AVB TG, Mar. 14, 2007, 12 pages.

Gunther, C., "Service Discovery of Audio/Video Streams in Ethernet AVB," IEEE 802, AVB Task Group, March Meeting, Mar. 14, 2007, 34 pages.

"802.1AS—Timing and Synchronization," IEEE 802, Nov. 13, 2008, 11 pages.

"802.1Qat—Stream Reservation Protocol," IEEE 802, Nov. 13, 2008, 6 pages.

"802.1Qav—Forwarding and Queuing Enhancements for Time-Sensitive Streams," IEEE 802, Nov. 13, 2008, 6 pages.

* cited by examiner

US 7,680,154 B2

METHODS AND APPARATUS FOR SYNCHRONIZING NETWORKED AUDIO DEVICES

BACKGROUND

Networked devices which render audio must do so synchronously, whether communicating over wires or wireless LANs, or both. WiFi "surround-sound" rear speakers for a computing device which also has directly-attached speakers is one representative instance. Not only must the clocks in the network interfaces be synchronized, but also the clock signal used by the audio device, specifically the D/A converter.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
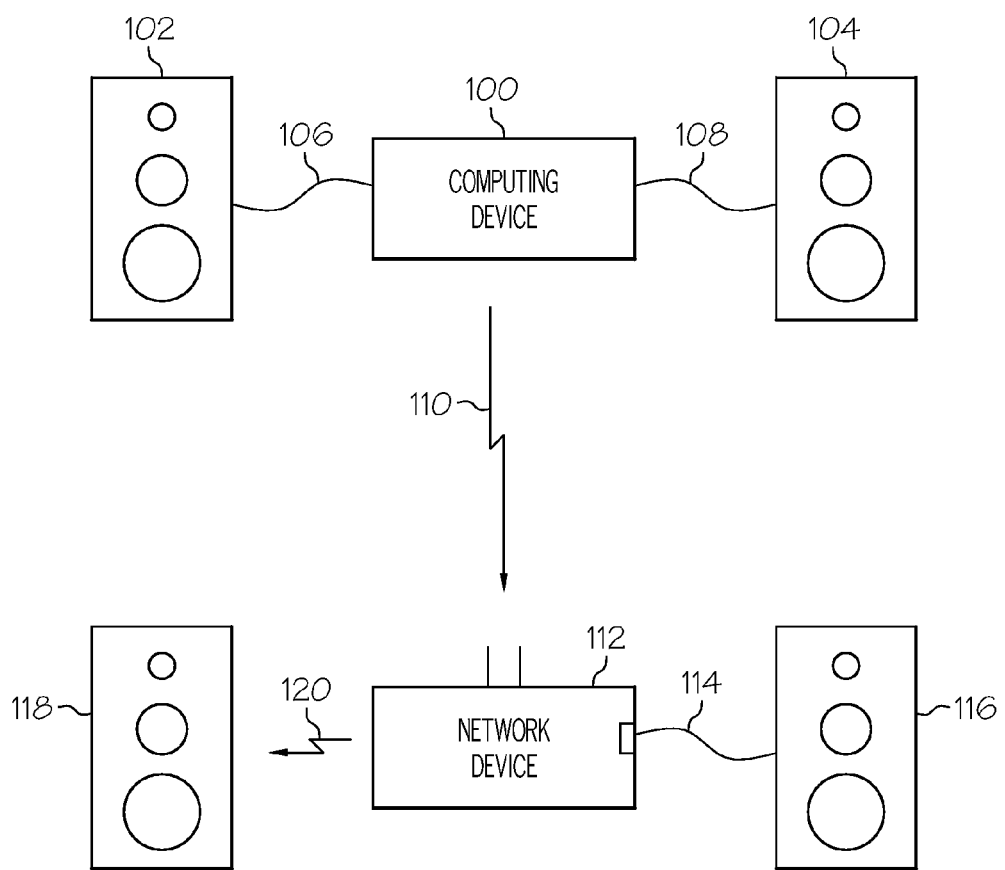
FIG. 1 shows a block diagram of an embodiment of a computing device and associated components.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as types and interrelationships of system components and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, an embodiment of a computing device 100 is shown. The computing device 100 is described in further detail in FIG. 2. In FIG. 1, the computing device 100 is illustratively shown as being physically connected to audio speakers 102, 104 through signal paths 106, 108, which in one embodiment may be audio cables. The computing device 100 is also shown as transmitting signal 110 to a network device 112, such as a station or router, for example. In one embodiment, the communication may occur through 802.11/Wife. In another embodiment, the communication may occur thorough an 802.3/Ethernet. In one embodiment, the network device 112 may communicate with audio speakers through a physical signal path, such as a signal path 114 connecting the network device 112 and an audio speaker 116. The network device may also communicate with an audio speaker 118 wireless through transmission of a wireless signal, such as signal 120. In the configuration illustrated in FIG. 1, the computing device 100 may transmit the signal 110 to the network device 112 allowing all of the audio speakers 102, 104, 116, 118 to be synchronized for use together in a manner further described in regard to FIG. 2. It should be appreciated that various audio or video devices may be implemented in the manner described in regard to the audio speakers 102, 104, 116, 118. For example, components such as microphones and MIDI interfaces may be implemented.

Figure 2:
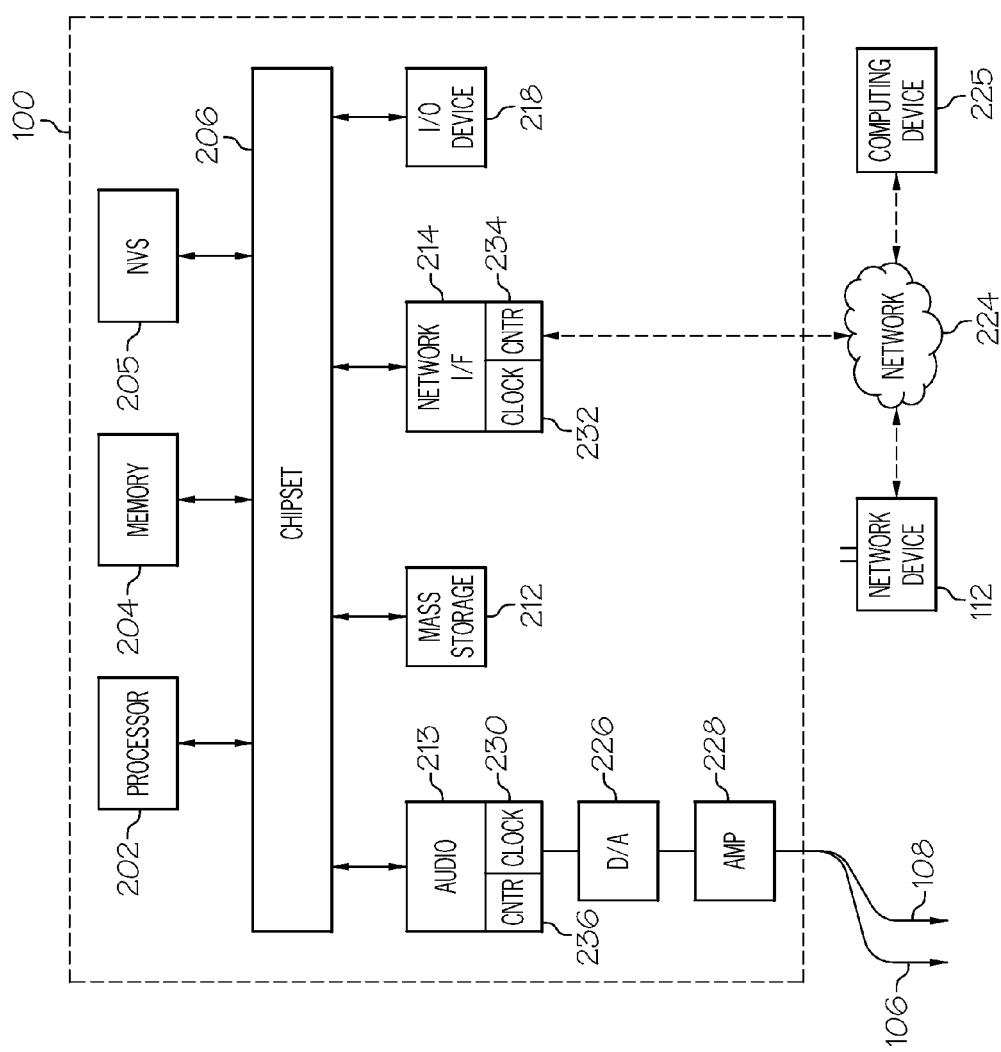
FIG. 2 shows a block diagram of a memory controller and a memory device.

Referring now to FIG. 2, the computing device 100 may include a processor 202 and a memory 204 coupled to a chipset 206. A mass storage device 212, a non-volatile storage (NVS) device 205, a network interface (I/F) 214, an audio device 213, and an Input/Output (I/O) device 218 may also be coupled to the chipset 206. Embodiments of computing device 100 include, but are not limited to, a desktop computer, a notebook computer, a server, a personal digital assistant, a network workstation, or the like. In one embodiment, the processor 202 may execute instructions stored in memory 204.

The processor 202 may include, but is not limited to, processors manufactured or marketed by Intel Corp., IBM Corp., and Sun Microsystems Inc. In one embodiment, computing device 100 may include multiple processors 202. The processor 202 may also include multiple processing cores. Accordingly, the computing device 100 may include multiple processing cores for executing instructions of the computing device 100.

The memory 204 may include, but is not limited to, Dynamic Random Access Memory (DRAM), Static Random Access Memory (SRAM), Synchronous Dynamic Random Access Memory (SDRAM), Rambus Dynamic Random Access Memory (RDRAM), or the like. In one embodiment, the memory 204 may include one or more memory units that do not have to be refreshed.

The chipset 206 may include a memory controller, such as a Memory Controller Hub (MCH), an input/output controller, such as an Input/Output Controller Hub (ICH), or the like. In an alternative embodiment, a memory controller for memory 204 may reside in the same chip as processor 202. The chipset 206 may also include system clock support, power management support, audio support, graphics support, or the like. In one embodiment, chipset 106 is coupled to a board that includes sockets for processor 202 and memory 204.

The components of computing device 100 may be connected by various interconnects. In one embodiment, an interconnect may be point-to-point between two components, while in other embodiments, an interconnect may connect more than two components. Such interconnects may include a Peripheral Component Interconnect (PCI), such as PCI Express, a System Management bus (SMBUS), a Low Pin Count (LPC) bus, a Serial Peripheral Interface (SPI) bus, an Accelerated Graphics Port (AGP) interface, or the like. I/O device 218 may include a keyboard, a mouse, a display, a printer, a scanner, or the like.

The computing device 100 may interface to external systems through network interface 214. The network interface 214 may include, but is not limited to, a modem, a Network Interface Card (NIC), or other interfaces for coupling a computing device to other computing devices. In the embodiment illustrated in FIG. 2, the computing device 100 is interfaced with a network 224, such as a Local Area Network (LAN), a Wide Area Network (WAN), the Internet, or any combination thereof. In one embodiment, network 224 is further coupled to a computing device 225 such that computing device 100 and computing device 225 may communicate over the network 224 through physical connections or wirelessly. The network device 112 may also communicate wirelessly with the network interface 214 through the network 224.

The computing device 100 also includes non-volatile storage 205 on which firmware and/or data may be stored. Non-volatile storage devices include, but are not limited to, Read-Only Memory (ROM), Flash memory, Electronically Erasable Programmable Read Only Memory (EEPROM), Non-Volatile Random Access Memory (NVRAM), or the like.

The mass storage 212 may include, but is not limited to, a magnetic disk drive, such as a hard disk drive, a magnetic tape drive, an optical disk drive, a solid state drive (SSD), or the like. It is appreciated that instructions executable by processor 202 may reside in mass storage 212, memory 104, non-volatile storage 205, or may be transmitted or received via network interface 214.

In one embodiment, the computing device 100 may execute an Operating System (OS). Embodiments of an OS include Microsoft Windows®, the Apple Macintosh operating system, the Linux operating system, the Unix operating system, or the like.

In one embodiment, the audio device 213, such as an audio card, may include an audio codec. The audio device 213 may be connected to a digital-to-analog (D/A) converter 226. The D/A converter 226 may be connected to an amplifier 228, which may be connected to the audio speakers 102, 104 shown in FIG. 1, through the signal paths 106, 108, respectively. The computing device 100 may also be used to communicate with the network device. The audio device 213 and network interface 214 may include a clock 230, 232, respectively, which each operate based upon a different crystal used for a time base. Thus, the audio speakers connected to the audio device 213, speakers 102, 104, and the speakers communicating wirelessly with the network computing device 100 through the network device 112, speakers 116, 118, may operate on different clocks, which may result in a time offset and which may result in a drift between the signals received by the speakers, thus synchronization of the clocks may be necessary.

In one embodiment, an IEEE standard such as 802.1AS plus this invention may be used to synchronize the various clocks across the network 224, e.g. the clock driving the D/A converter 226 within the computing device 100 and the clocks driving the signals 110 and 114 to two WiFi speakers 116, 118 that play front and rear surround-sound audio that is properly synchronized to the speakers 102 or 104 that are associated with the computing device 100. In one embodiment both network speakers, such as speakers 116, 118 and local computing device speakers, such as speakers 102, 106 may be kept in synch with each other.

In one embodiment, the network interface 214 and audio device 213 may include counters 234, 236, respectively. Each of the counters 234, 236 may be registers containing the representation of time of the clocks 230, 234. In one embodiment, each counter 234, 236 may be read by software in approximately 1 μs. Reading both counters 234, 236 may allow correlation of the 'time' in the network device, such as network card 204 with the 'time' in the audio hardware, such as audio device 213. Correlation may enable the audio to be maintained in synch among audio components both physically and wirelessly connected with the computing device 100. 802.1AS may provide the time correlation between counter 234 and counters in other devices attached to the network. In one embodiment, counters 234 and 236 may be read quickly and without any intervening processor instructions.

Figure 3:
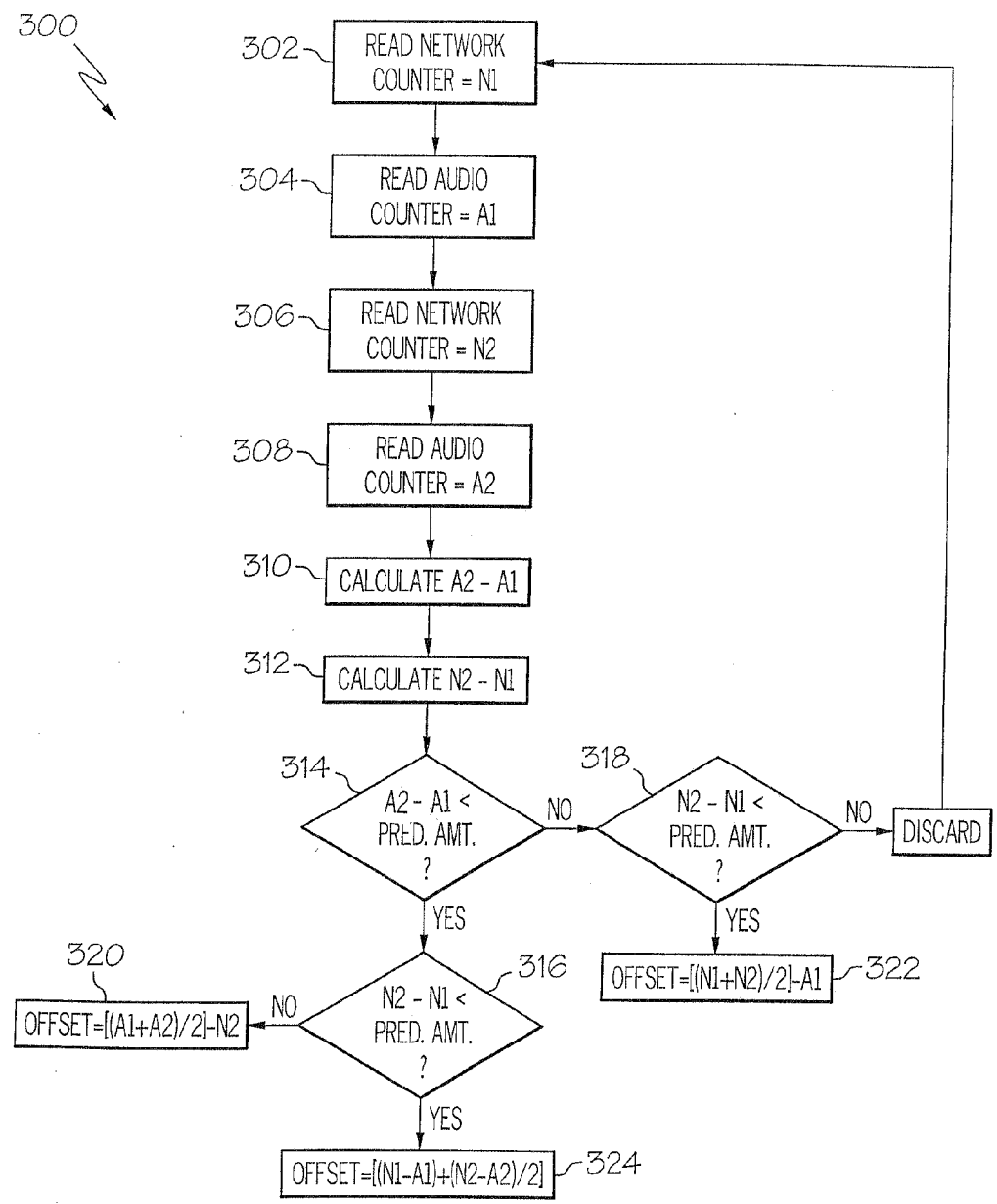
FIG. 3 shows a flowchart of a routine for memory mirroring.

Referring now to FIG. 3, a flowchart 300 is shown of a routine that may be used to synchronize audio speakers in a network-attached device such as computing device 100 or network device 112 through adjusting the clock 230 of the audio device 213 or through sample rate conversion using the processor 202. At blocks 302-308, the network counter 234 may be read twice (N1, N2) and the audio counter may be read twice (A1, A2) in an interleaving manner. In one embodiment, the audio counter reads A1, A2 are subtracted from one another at block 310 and the network counter reads N1, N2 are subtracted from one another 312. The difference A2−A1 is compared to a predetermined amount at block 314 and the difference N2−N1 is compared to a predetermined amount at blocks 316, 318. If the differences are each less than the predetermined amount, the measurements may be considered valid, and thus used. In one embodiment, the predetermined amount may be three register access times. Invalid measurements may be caused by power saving measures of the computing device 100, a non-maskable interrupt (NMI), or other events not visible to an operating system, for example.

In one embodiment, if (A2−A1), block 314, is less than the predetermined amount, but (N2−N1) is more then the predetermined amount at block 316, a perturbing event may have occurred between N1 and A1 which renders the measurement invalid. Similarly, if (N2−N1) is less than the predetermined amount at block 318 and (A2−A1) is more than the predetermined amount at block 314 a perturbing event may have occurred between N2 and A2. In either case, the offset may be computed as either:

$$\text{Offset}=(A2+A1)/2-N2 \text{ at block 320} \quad (1)$$

or $$\text{Offset}=(N2+N1)/2-A1 \text{ at block 322} \quad (2)$$

If both differences are less than the predetermined amount an offset between the audio and network counters 236, 234, respectively, may be computed as [(N1−A1)+(N2−A2)]/2 at block 324, which may increase the accuracy of the offset measurement. In one embodiment, the first or last read may be eliminated if reads are expensive or the probability of a perturbation is low. A perturbation may still be detectable in this case, but mitigation may not be possible (as it is above) so the measurement may be marked invalid. Upon calculating the audio clock offset, the clock 230 may be adjusted accordingly to synchronize audio devices. It should be appreciated that the audio counter 236 may be sampled before the network counter 234 with the interleaving maintained and the equations adjusted appropriately.

If neither of the differences (A2−A1) (at block 314) or (N2−N1) (at block 318) is less than the predetermined amount, such as three register access times, a perturbing event may have occurred between A1 and N2. In this case, the clock measurements are discarded and the routine may return to block 302.

Figure 4:
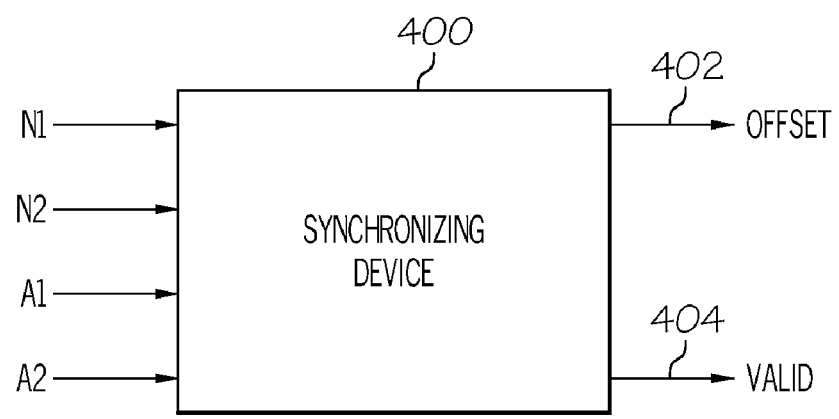
FIG. 4 shows a block diagram of a device that may be used for synchronizing audio components.

FIG. 4 shows an embodiment of a hardware implementation of the flowchart 300. FIG. 4 illustrates synchronizing device 400, which may be one or more subcomponents of the computing device 100, and may be operated by stand-alone software or software operating on the computing device 100. As illustrated in FIG. 4, the computing device 400 receives the counter reads N1, N2, A1, A2 to compute the differences and audio clock offset and offset validity as indicated above. An output 402 provides the audio clock offset computed by a routine, such as that shown in the flowchart 300. If the calculated offset is not to be discarded, an output 404 may indicate that the calculated offset is valid and may be used for adjusting the audio clock 230.

In another embodiment, if the probability of perturbing events is high, additional measurements (e.g. N3 and A3, N4 and A4, etc.) may be added to the interleaved measurements of FIG. 3 in order to increase the probability of computing a valid offset.

In another embodiment, the routine of the flowchart 300 may be expanded to read m counters n(i) times each, where n(i) may be an even number chosen as a function of the variability of clock i. This approach may be implemented in a PC environment where independent clock sources are employed for each of: network interface, an audio codec, video hardware, central processing unit (CPU), and other relevant entities. While the probability of inadvertently capturing a perturbation increases with m and n(i), as above for the case where m=n(i)=2, the subset of measurements containing the perturbation may be pruned from the computation. However, rather than being thrown away, any subset of pruned measurements not containing a perturbation may be used as an independent correlation computation and either used to test the validity of the main correlation computation, or combined with it by averaging the results.

A finite bias is introduced by reading either counter 236 or counter 232 first. Another embodiment of the invention computes the bias and corrects the offset computed above.

Where the multiple offsets are combined in a way to reduce the error below that of any one offset measurement.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method comprising:
    determining a network counter value indicative of a network clock time of a system at a first time instant and a second time instant occurring later in time than the first time instant,
    determining an audio counter value indicative of an audio clock time of the system at a third time instant, occurring between the first and second time instants, and a fourth time instant occurring later in time than the second time instant,
    determining an offset based upon the determined network counter values and the audio counter values, and
    adjusting the audio clock time based upon the determined offset to synchronize operation of at least one audio component operating according to the audio clock with at least one audio component operating according to the network clock.

2. The method of claim 1, further comprising determining if a difference of the network counter values at the second time instant and the first time is less than a predetermined threshold,
    determining if a difference of the audio counter values at the fourth time instant and the third time instant is less than the predetermined threshold, and
    wherein, determining an offset comprises determining an offset, if both determined differences are less than the predetermined threshold, according to the equation:

$$[(N1-A1)+(N2-A2)]/2$$

wherein, N1 is the network counter value at the first time instant, A1 is the audio counter sample at the third time instant, N2 is the network counter value at the second time instant, and A2 is the audio counter value at the fourth time instant.

3. The method of claim 2, wherein the determining an offset comprises determining an offset, if the network counter value difference is determined to be greater than or equal to the predetermined threshold and the audio counter value difference is less than the predetermined threshold, according to the equation $[(A2+A1)/2]-N2$.

4. The method of claim 2, wherein the determining an offset comprises determining an offset, if the audio counter value difference is determined to be greater than or equal to the predetermined threshold and the network counter value difference is less than the predetermined threshold, according to the equation $[(N2+N1)/2]-A1$.

5. The method of claim 2, further comprising indicating the offset is invalid if the both the audio counter value difference and the network counter value difference are determined to be greater than or equal to the predetermined threshold.

6. The method of claim 1, wherein the adjusting the audio clock time with the determined offset comprises adjusting the audio clock time with the determined offset to synchronize operation of at least one audio speaker operating according to the audio clock with at least one audio speaker operating according to the network clock.

7. A system comprising:
    a network device having a network clock and a network counter containing a value indicative of the network clock time,
    an audio device having an audio clock and an audio counter containing a value indicative of the audio clock time,
    a first and second audio component, the first audio component to operate according to the network clock and the second audio component to operate according to the audio clock, and a machine readable medium programmed with a plurality of instructions, and a processor, upon executing the plurality of instructions, is caused to:

determine an network counter value indicative of a network clock time of a system at a first time instant and a second time instant occurring later in time than the first time instant, determine a audio counter value indicative of an audio clock time of the system at a third time instant occurring between the first and second time instants and a fourth time instant occurring later in time than the second time instant, determine an offset based upon the determined network counter values and the audio counter values, and adjust the audio clock time based on the determined offset to synchronize operation of the first audio component the second audio component.

8. The system of claim 7, wherein the processor, upon executing the plurality of instruction, is further caused to:

determine if a difference of the network counter values at the second time instant and the first time instant is less than the predetermined threshold, and determine if a difference of the audio counter values at the fourth time instant and the third time instant is less than the predetermined threshold, and determine the offset, if both determined differences are less than the predetermined threshold, according to the equation:

$$[(N1-A1)+(N2-A2)]/2$$

wherein, N1 is the network counter value at the first time instant, A1 is the audio counter sample at the third time instant, N2 is the network counter value at the second time instant, and A2 is the audio counter value at the fourth time instant.

9. The system of claim 8 wherein, the processor, upon executing the plurality of instruction, the processor is further caused to:

determine the offset, if the network counter value difference is determined to be greater than or equal to the predetermined threshold and the audio counter value difference is less than the predetermined threshold, according to the equation $[(A2+A1)/2]-N2$.

10. The system of claim 8 wherein, the processor, upon executing the plurality of instruction, the processor is further caused to:

determine the offset, if the audio counter value difference is determined to be greater than or equal to the predetermined threshold and the network counter value difference is less than the predetermined threshold, according to the equation $[(N2+N1)/2]-A1$.

11. The system of claim 8, wherein, upon executing the plurality of instruction, is further caused to:

indicate the offset is invalid if the both the audio counter value difference and the network counter value difference are determined to be greater than or equal to the predetermined threshold.

12. The system of claim 7, wherein at least one of the first and second audio components is a microphone.

13. The system of claim 7, wherein one of the first and second audio components is a MIDI interface.

14. A system comprising:

a plurality of network clocks, wherein one of the plurality of network clocks is selected as a base clock signal, a plurality of audio devices, each one of the audio devices to operate according to an associated one of the plurality of network clocks, a machine readable medium programmed with a plurality of instructions, and a computing device, upon executing the plurality of instructions, is caused to:

sample each of the plurality of network clocks at a number of time instants, the number of time instants for sampling of each of the plurality of network clocks being a function of variability of each of the plurality of network clocks, determine an offset for each of the plurality of network clocks not used as the base clock signal, the offset of each of the plurality of the network clocks being a function of the determined samples of the respective network clock and the base clock signal, adjust each of the plurality of network clocks based upon a respective determined offset and the base clock signal, and operate each of the audio devices according to a respective adjusted network clock.

15. The system of claim 14, wherein the number of time instants of each of the plurality of network clocks sampled are even numbers.

* * * * *